Oct. 27, 1936.   J. A. LUNN   2,058,701

CLUTCH FACING AND PROCESS OF MAKING THE SAME

Filed June 23, 1934

Inventor
John A. Lunn
per
Wm B. Wescott
Attorney

Patented Oct. 27, 1936

2,058,701

UNITED STATES PATENT OFFICE 2,058,701

CLUTCH FACING AND PROCESS OF MAKING THE SAME

John A. Lunn, Cambridge, Mass., assignor, by mesne assignments, to Raybestos-Manhattan, Inc., Passaic, N. J., a corporation of New Jersey Application June 23, 1934, Serial No. 732,074

5 Claims. (Cl. 192—107)

This invention relates to the manufacture of improved clutch facings or clutch rings, and especially those of the woven disk type and of the character used in disk clutches and brakes. For convenience, such rings will hereafter be referred to as clutch facings.

A number of different clutch facings have, from time to time, been suggested and in general they may be classified in two groups. One class embraces annular rings stamped from sheets or boards of asbestos made on a paper machine and subsequently treated to impart thereto the desired coefficient of friction and wearing resistance. The other class is made from a strip of fabric, woven to the required width, and then shaped and molded into the form of a flat ring. The yarn employed is long fibered asbestos reinforced if necessary with cotton or other fibers, and usually associated with one or more metallic wires running parallel therein.

I have found that a woven strip, molded to form, is superior to the stamped or died ring for the reason that it provides two selvage edges around the entire ring. The joining of the ends of this strip, however, to complete the ring presents special difficulties since the ring is subjected while it is in use to severe strains tending to open the joint and thus destroy the usefulness of the facing. The usual practice has been to unite the ends of the strip by fasteners so inserted that they either wear rapidly while in use and thus break after a short time, or they are so arranged as to bend when an unusual strain is placed upon them sufficient to allow the joint to open. An even more important objection to a facing thus fastened arises from the fact that the exposed surface of the staples forming the metallic fastening tend to cut a groove or indentation in the surface of the driving or driven metallic face with which it is made to contact, and produces thereon what is technically known as scoring or grooving.

The danger of thus damaging the metallic face of the contacted plates is greatest in the so-called initial or run-in period. During this period high pressure areas are developed more particularly at the joint in the facing and the exposed portions of the metallic facing or staples wear grooves in the plates.

It is the object of this invention to provide a clutch facing of the woven-fiber type which will be securely joined by metallic fasteners which are fully protected from wear and abrasion by the moving parts of the driving mechanism. A further object is to provide a clutch facing with a contacting surface free from metallic parts which tend to cut or score the adjoining driving plates. Yet an additional object is to provide a clutch facing that may be ground to cut or score the adjoining driving plates. Yet an additional object is to provide a clutch facing that may be ground to a true flat surface without weakening the staples forming the joint. Other objects and advantages will appear as the description proceeds.

I have discovered an improved method of joining the two ends of the woven strip or fabric by which a highly efficient facing is produced. This result is accomplished by compressing the staples and the adjacent body of the annulus whereby the fabric mass is, in the compressed area, rendered dense and retentive of the fastening staples, and its surface is positioned below that of the work surface of the clutch facing. Preferably the indentations thus produced are filled with a plastic mass which, when indurated, forms a resistant compound with the proper coefficient of friction and hardness. In this manner the metallic staples are positioned in the body of the facing and do not contact with the metal plates of the driving or driven parts of the mechanism.

To illustrate my invention, I refer to the accompanying drawing.

The woven fabric is cut and shaped to form an annular ring 10, the ends 11 being fitted in abutting relation to each other with an accuracy that provides a continuous uniform surface throughout the circumference of the ring. The two abutting ends 11 are then joined by metallic staples 12 spaced at predetermined intervals as may be seen in Fig. 1, and inserted by methods ordinarily employed in this art. In this condition the facing is now thoroughly impregnated with a bonding material capable of being solidified by heat or other well known means and is superficially dried. The composition of such bonding materials is not a part of this invention, is well understood in the art, and will not be here further described.

Figure 1:
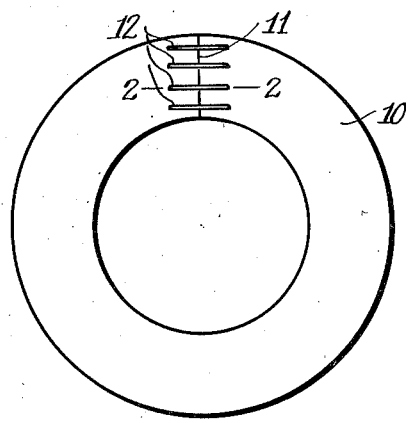
Figure 1 represents a woven and joined facing after impregnation but before molding.
Figure 2:
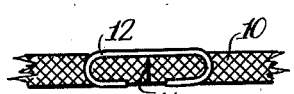
Fig. 2 is a sectional view on the line 2—2 of Fig. 1 before pressure has been applied in the mould.

An alternative method of preparing the woven and joined ring is to impregnate the yarn during the process of weaving, the joined product being then dried to a proper consistency for subsequent handling. Such a facing is shown in Fig. 1. A sectional view showing the position of the staples 12 relative to the body 10 of the ring is shown in Fig. 2.

The mould in which the facing thus produced may be finally shaped, is provided at one point in its circumference with a number of bosses or bars corresponding to the number of metallic staples which appear in the facing, and so positioned that each bar contacts with an individual staple at the joint. When pressure is applied, the ring is given a permanent and desired shape and the bosses of the mould drive the individual staples 12 below the surface of the facing to a sufficient depth to avoid being weakened when the surfaces are ground and finished, and to avoid their contacting with the plate of the driven or driving member of the mechanism when assembled.

Figure 3:
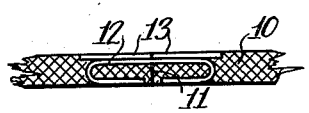
Fig. 3 is a sectional view on the same line after the molding operation is complete.
Figure 4:
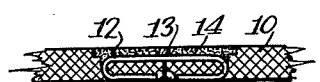
Fig. 4 is a sectional view in the line 4—4 of Fig. 5 after the recess formed by the bosses of the mould have been filled.
Figure 5:
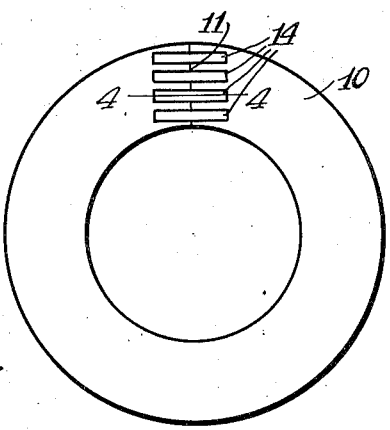
Fig. 5 is a view of the finished facing showing the side that contacts the driving plate.

The indentations indicated at 13 in the surface of the facing occasioned by the depression of the staples 12 are shown in Fig. 3 and are filled with any of the well known oxidizing oil plastic mixtures, or rubber compositions indicated at 14, as seen in Fig. 4. The facing is then baked in accordance with any of the usual methods now employed for this purpose, the finished facing appearing as shown in Fig. 5.

The hardened article is now ground to parallel surfaces and furnishes a friction element of wide utility, free from the danger of scoring incident to the contact of metallic fasteners with the friction producing surface.

I claim:

1. A clutch facing of the woven-fabric-joined type having indentations below the surface level, staple fasteners in said indentations, said indentations being filled with a friction producing material.

2. In a process for making an annular friction producing surface, the steps which comprise joining a strip of woven impregnated fabric into an annulus by means of metallic staples, compressing said staples together with the adjacent annulus by pressure in a mould, filling the recesses thus produced in the surface of the annulus with a plastic mass, and baking said annulus.

3. An annular friction element comprising an interrupted ring of fabric having cooperating indentations in the workng face thereof adjacent the ends of the ring and staples joining the ends together located in the indentations, the upper surface of the staples being beneath the working surface of the ring.

4. An annular friction element comprising an interrupted ring of fabric having cooperating indentations in the working face thereof adjacent the ends of the ring and staples joining the ends together located in the indentations, said indentations being filled with a baked plastic mass.

5. An annular clutch facing comprising an interrupted ring of indurated friction fabric, a cooperating indentation the axis of which forms a cord of the ring, adjacent the ends thereof, and a staple joining the ring located in the indentation, said indentation being deeper than the thickness of the staple.

JOHN A. LUNN.